April 3, 1951        A. J. BURKE        2,547,564
DEVICE FOR USE IN BATHING INFANTS
Filed Feb. 28, 1949
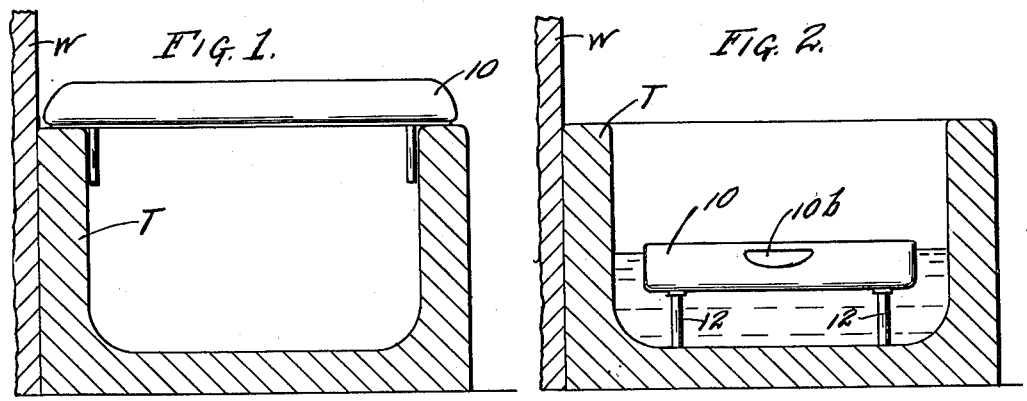
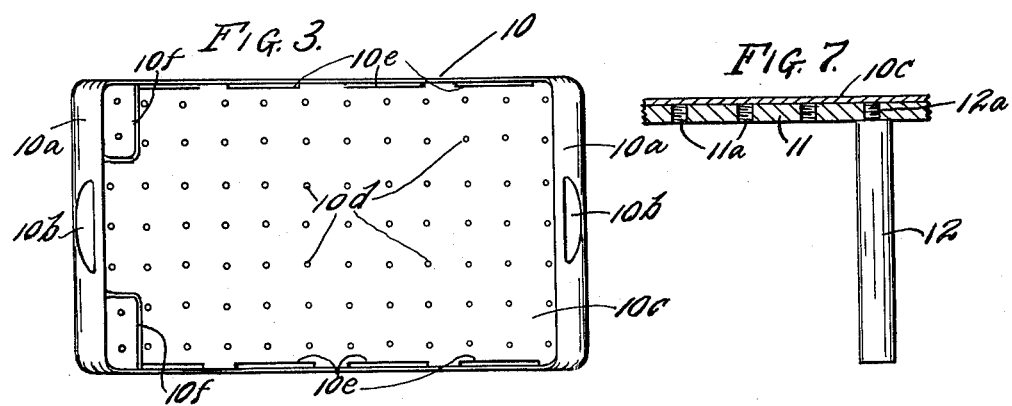
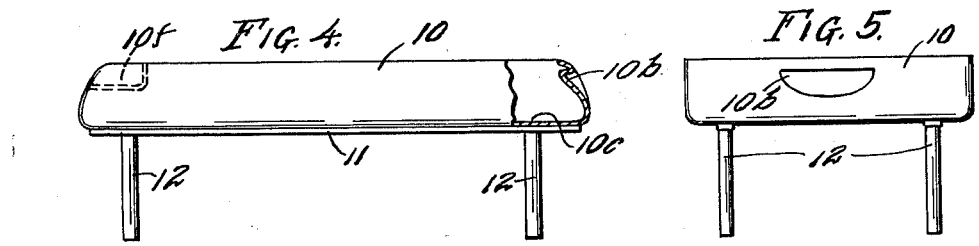
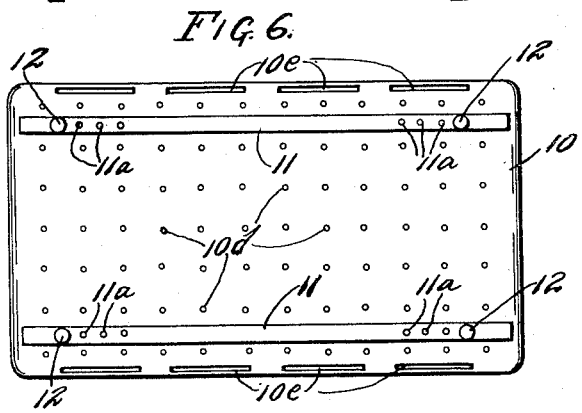
Inventor
Arthur J. Burke
By Chas. E. Reyf.
Attorney Patented Apr. 3, 1951

2,547,564

UNITED STATES PATENT OFFICE 2,547,564

DEVICE FOR USE IN BATHING INFANTS

Arthur J. Burke, Minneapolis, Minn.

Application February 28, 1949, Serial No. 78,853

4 Claims. (Cl. 4—185)

This invention relates to a device for use in bathing babies. In bathing infants it is desirable to have some support for the infant adjacent a water supply, such as the ordinary bathtub, whereby the infant can be easily handled and washed or sponged. It is often desirable to have some support for effectively containing the infant which can be readily submersed in water, such as water in a bathtub.

It is an object of this invention to provide a simple and efficient device having means for supporting and retaining the infant while being washed, sponged and rinsed, which device can also be used to support and retain the infant while the latter is being immersed in water.

It is a further object of the invention to provide a device for use in bathing an infant comprising a comparatively shallow receptacle preferably of general rectangular form in plan, said receptacle having a perforated bottom and having means adjacent its ends depending from its bottom, said means preferably being in the form of pairs of transversely spaced legs adapted to engage the side walls of the tub and prevent movement of said receptacle transversely of said tub when it is resting on the top of said tub and extending transversely thereof, said legs or means also being adapted to support said receptacle above the bottom of said tub when it is placed in said tub and extending longitudinally thereof.

It is another object of the invention to provide a device for bathing babies comprising a comparatively shallow receptacle preferably made of sheet material and being of general rectangular form in plan, the end walls of said receptacle preferably converging toward the top of said receptacle, said end walls being provided with handholds, pairs of legs secured in the bottom of said receptacle adjacent the ends thereof, the legs of each of said pairs being spaced transversely of said receptacle, said receptacle having a multiplicity of perforations in its bottom together with means for holding said legs in different positions to suit tubs of different widths whereby said legs may depend into a bathtub when said receptacle is resting on the top of said tub and extending transversely thereof, said legs being adapted to engage the walls of said tub and prevent movement of said receptacle transversely of said tub, said legs also being adapted to engage the bottom of said tub and support said receptacle above the bottom of said tub when said receptacle is placed in said tub extending longitudinally thereof.

These and other objects and advantages of the invention will be fully set forth in the following description made in connection with the accompanying drawings in which like reference characters refer to similar parts throughout the several views and in which—

Fig. 1 is a view in side elevation of said device showing the same supported on a bathtub and extending transversely thereof, said bathtub being shown in transverse vertical section;

Fig. 2 is a view showing the device disposed in a bathtub and extending longitudinally thereof, said bathtub being shown in transverse vertical section;

Fig. 3 is a top plan view of said device;

Fig. 4 is a view in side elevation of said device, some parts being broken away and others being shown in vertical section;

Fig. 5 is a view in end elevation of said device;

Fig. 6 is a bottom plan view of said device; and

Fig. 7 is a partial view taken substantially on line 7—7 of Fig. 3.

Referring to the drawings, a device is shown comprising a pan or receptacle 10. While receptacle 10 might be variously formed, it preferably is formed of sheet metal material, such as metal or plastic, and the same is preferably of general rectangular shape in plan. The depth of the receptacle 10 is comparatively small so that a shallow receptacle is formed. The end walls 10a of said receptacle preferably converge upwardly, as shown in Figs. 1 and 4. Said end walls 10a are formed with means for lifting said receptacle, such as the handholds 10b, said handholds being formed by re-entrant portions of said end walls 10a and being pressed or molded therein. The bottom 10c of receptacle 10 is provided with a multiplicity of holes or perforations 10d and said bottom also is provided with a plurality of spaced slots 10e extending therethrough. Legs are provided for said receptacle depending from the bottom thereof and while these could be formed and secured in various ways, in the embodiment of the invention illustrated said receptacle has a pair of bars 11 secured to its bottom and extending longitudinally thereof adjacent the side walls of said receptacle. Bars 11 are each provided with a plurality of tapped holes 11a adjacent each end of said bars. Legs 12 are provided, and while these might be variously formed, in the embodiment of the invention illustrated they are shown as made of round rods having reduced threaded end portions 12a. End portions 12a are adapted to be screwed into the holes 11a. Soap receptacles 10f may be provided in one end of main receptacle 10.

When it is desired to wash or sponge the baby, the receptacle 10 is placed on the tub extending transversely thereof, as shown in Fig. 1. Legs 12 at this time depend into the tub T and are disposed close to the side walls thereof so that movement of receptacle 10 transversely of the tub is prevented. The baby can now be placed in receptacle 10 and will be effectively and safely supported and retained therein. The baby can now be sponged and washed in various positions and the water will drain into the tub T. Due to the converging end walls of receptacle 10, the handholds 10b are easily accessible adjacent the wall W against which tub T may be disposed. If it is desired to submerge the infant, water can be placed in the tub, as shown in Fig. 2, and the receptacle 10 will then be lifted and placed into the tub extending longitudinally thereof. Said receptacle will then be supported by the legs 12 above the bottom of said tub, as shown in Fig. 2. Legs 12 thus have the double function of serving as stops or retaining means when the receptacle is resting on top of the tub and extending transversely thereof and also acting as supports for holding the receptacle 10 above the bottom of the tub, as shown in Fig. 2. By having a plurality of the holes 11a, the legs 12 can be easily disposed in different positions to suit different widths of tubs.

From the above description it will be seen that I have provided a simple yet very efficient device for use in bathing an infant. The baby is conveniently supported in receptacle 10 and is safely retained therein. The baby can be placed in different positions on the bottom of receptacle 10 and washed and sponged as desired. Receptacle 10 can then be placed in the tub, as shown in Fig. 2, and the baby immersed in water if desired. The device can be made to be quite light in weight and can be easily handled by the mother or other attendant. The receptacle can be easily lifted by engaging the handholds 10b. The device has been found to be very useful for containing the baby while its diaper is changed. The baby can be laid in the receptacle for this operation. It can then be very conveniently washed or cleaned. It has also been found that the dressing of the baby can be completed while it is still in the receptacle as the latter dries very quickly. The device has been amply demonstrated in actual practice and found to be very successful and efficient.

It will be seen that with the use of the device the baby is at all times safely and conveniently supported. The mother or other attendant thus does not have to hold the baby with one hand and soap and wash it with the other. Both hands can be used to wash the baby which, as stated, is safely supported. The necessity for holding the wet baby is done away with, and all danger of dropping the baby is eliminated. A shower attachment may be used for rinsing or clear water drawn into the tub or an adjacent wash stand may be used. With an older baby, it can be first washed with the device in the position shown in Fig. 2 with the water at the desired depth. The receptacle with the baby therein can then be lifted and placed in the position shown in Fig. 1, in which position the baby can be dried and dressed.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A bathing apparatus for infants having in combination, a shallow receptacle having substantially flat bottom portions adapted to rest on a bathtub, said receptacle having a multiplicity of perforations in its bottom, pairs of legs secured to the bottom of said receptacle adjacent the ends thereof, the legs of each pair being spaced transversely of said receptacle and being adapted to extend downwardly in said tub at the side walls thereof and prevent movement of said receptacle transversely of said tub when resting on the top of said tub, said legs also being adapted to rest on the bottom of said tub and support the receptacle in said tub.

2. A bathing apparatus for infants having in combination, an elongated receptacle having substantially flat bottom portions adapted to extend over and rest on the sides of a bathtub, pairs of legs rigidly and removably secured to the bottom of said receptacle adjacent the ends thereof having their longitudinal axes substantially at right angles to the bottom of said receptacle, the legs of said pairs being spaced transversely of said tub and adapted to substantially engage the inner surfaces of the walls of said tub to prevent movement of said receptacle transversely of said tub when resting on said tub transversely thereof, means for holding said legs in different positions to suit various widths of tubs, said legs also being adapted to support said receptacle well above the bottom of said tub when placed in said tub and extending longitudinally thereof.

3. A bathing apparatus for infant's having in combination, a comparatively shallow receptacle of general rectangular form in plan, said receptacle having a reticulated bottom, bars extending longitudinally of said receptacle on the bottom thereof adjacent the sides thereof, said bars having a plurality of tapped holes therein adjacent each end of said receptacle, legs having reduced threaded portions receivable in said tapped holes whereby there are pairs of legs adjacent each end of said receptacle and the legs of each pair are spaced transversely of said receptacle, said legs extending downwardly in said tub at the side walls thereof and preventing movement of said receptacle transversely of said tub when extending across said tub and resting on the top thereof.

4. An apparatus for bathing infants having in combination, an elongated member adapted to receive and support an infant, said member having a substantially flat bottom portion adapted to extend over and rest on the sides of a bathtub, elongated rigid members secured to and extending downwardly from said bottom portion adjacent the ends thereof and arranged to engage the inner surfaces of the side walls of said tub and prevent movement of said member transversely of said tub when said bottom is resting on the sides of said tub and extending transversely thereof, said elongated members also being adapted to engage the bottom of said tub and support said member well above the bottom of said tub when said member is disposed within said tub and extending longitudinally of said tub.

ARTHUR J. BURKE.

REFERENCES CITED

The following references are of record in the file of this patent:

UNITED STATES PATENTS

| Number | Name | Date |
|---|---|---|
| 986,265 | Boss | Mar. 7, 1911 |
| 1,501,833 | Amsel | July 15, 1924 |